Jan. 26, 1954
R. D. SLAYTON
2,667,535
METHOD AND APPARATUS FOR PHOTOELECTRIC
SENSING OF PERMUTATED TAPE
Filed Oct. 14, 1950
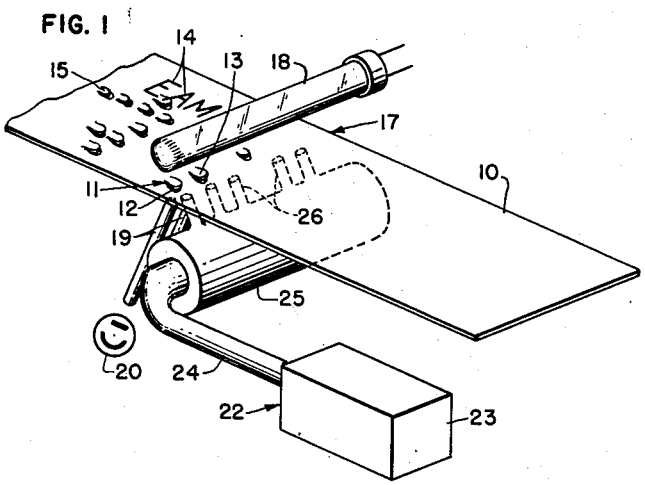
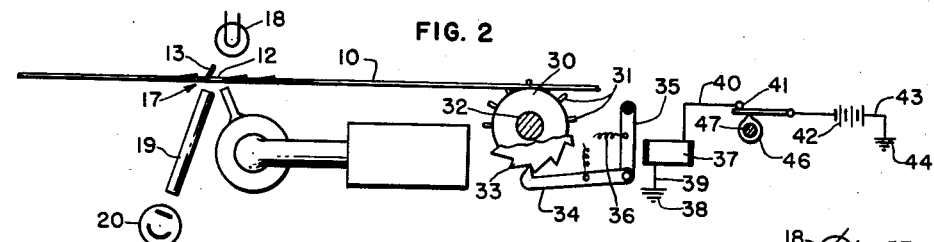
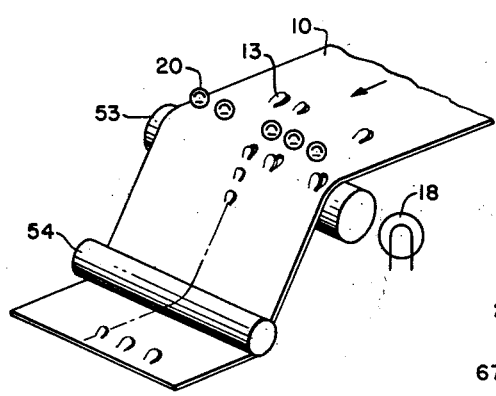
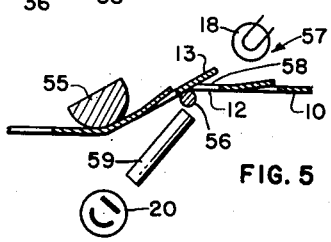
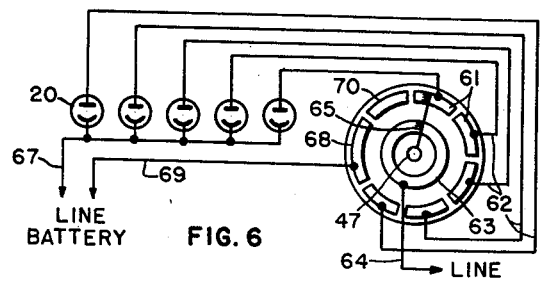
INVENTOR
RANSOM D. SLAYTON
BY Emery Robinson
ATTORNEY Patented Jan. 26, 1954

2,667,535

UNITED STATES PATENT OFFICE 2,667,535

METHOD AND APPARATUS FOR PHOTO-ELECTRIC SENSING OF PERMUTATED TAPE

Ransom D. Slayton, Elmhurst, Ill., assignor to Teletype Corporation, Chicago, Ill., a corporation of Delaware Application October 14, 1950, Serial No. 190,110

14 Claims. (Cl. 178—17)

This invention relates to a method and apparatus for sensing permutated tape and more particularly to apparatus and methods for sensing tape wherein the permutations consist of lidded apertures.

In automatic telegraphy, tape controlled telegraph transmitting devices are employed in which code combinations in the form of perforations are placed transversely and successively on a continuous tape preform. A set of sensing elements senses the transverse areas of the said tape to determine the presence or absence of perforations in each position of the tape and in accordance with the finding of each sensing element an associated electrical circuit is energized to transmit code combinations in accordance with the permutated perforations of the tape. In the present invention the particular type of tape used is that disclosed in Patent No. 2,273,909 to C. W. Swan dated February 24, 1942, wherein there is disclosed a tape having punched perforations in which each of the perforations has a lid covering the perforation. An advantage of the use of this type of tape may be readily appreciated as the tape is suitable for containing not only the punched perforations but also printed characters positioned on top of the lidded apertures in the tape.

Prior devices such as disclosed in Patent No. 2,326,148 to E. S. Larson et al. dated August 10, 1943, utilized mechanical tape sensing fingers to sense the transverse rows of lidded apertures in the tape as it is progressively advanced through a tape sensing station.

It is an object of this invention to provide a more efficient and accurate method and apparatus for sensing the permutations of lidded apertures in tape.

A further object of this invention is to provide a method and apparatus for sensing the permutations with photoelectric cells.

A still further object of this invention is to provide a method and apparatus for raising the lids of the apertures in permutated tape to allow the passage therethrough of light to actuate a series of photo-electric cells.

It is another object of this invention to utilize the light passed through the apertures in permutated tape to actuate a telegraph transmitter.

With these and other objects in view, the present invention contemplates a method of advancing a tape having series of permutated lidded apertures through a sensing station wherein the lids on the tape are raised by bending the tape or by projecting a blast of air against the tape. A light source positioned above or below the tape, at the sensing station, passes light through the apertures of the raised lids to a bank of photo-electric cells to energize the cells. Each of the cells is electrically connected to a standard transmitter distributor whereby the energized cells transmit impulses to the transmitter which are picked up and sent over an outside signaling channel, to an outlying receiving station.

Other objects and advantages of the present invention will be apparent from the following detailed description when considered in conjunction with the accompanying drawing, wherein:

Fig. 1 is a perspective view disclosing a tape passing through a sensing station having therein a blower for raising the lids on permutated tape.

Fig. 2 is an elevational view showing the sensing station and means for advancing the tape in a step by step manner through the sensing station.

Fig. 3 discloses a modified sensing station wherein the tape is advanced to bend the tape so that the lidded apertures are progressively raised, as the tape advances.

Fig. 4 illustrates another modified form of the invention wherein the tape is illuminated by a light conducting rod.

Fig. 5 discloses another embodiment of the invention wherein the path of the tape is changed to raise the lids at the sensing station to permit light to pass therethrough and be conveyed to a photo-electric sensing means.

Fig. 6 discloses a circuit diagram of photo-electric cells for sensing the permutations in the tape and the control circuit for actuating a telegraph transmitter of the commutator brush type.

Referring to the drawings wherein like reference numerals designate the same elements throughout the several views and more particularly to Fig. 1, a permutated tape 10 is disclosed having a series of transverse permutations 11 thereon. Each permutation consists of an aperture 12 having a lidded portion 13 which normally covers the aperture. Thus it is possible to have printed characters 14 placed on top of the lidded portions of the tape as well as on the solid portions of the tape. The tape 10 has a plurality of feed perforations 15 similar to the permutations 11, that is, the apertures are each covered with a lid.

The tape 10 is progressively advanced through a sensing station 17 wherein the lids on the permutated perforations are raised so that light from a lamp 18 passes through the apertures 12 and through a series of photo-conductive rods 19. The number of photo-conductive rods 19 is determined by the number of longitudinal rows of permutations in the tape. Positioned adjacent to the other end of each of the rods 19 is a photoelectric cell 20 which may be of any type such as a photo-conductive cell, photo-voltaic cell, or photo-emissive cell. All that is necessary is that these cells be sensitive to light and be capable of varying the characteristics of an electrical circuit.

The lids 13 of the permutations 12 may be raised by means of a blower 22 as illustrated in Fig. 1. The blower comprises a source of compressed air 23 which may be a fan or air compressor. The air passes from the source 23 through a conduit 24 through a manifold 25 and hence through a plurality of nozzles 26. These nozzles 26 are positioned in close proximity to the ends of the rods 19 and close to the path of the under side of the tape 10. Thus, as the tape 10 advances through the sensing station 17 the blower 22 raises the lids 11 to permit light to pass through the apertures 12 and hence through the rods 19 to actuate the photo-electric cells 20 in accordance with the permutations in the tape 10.

Referring to Fig. 2 there is shown apparatus for advancing the tape 10 through the sensing station 17 in a step by step feed. This is accomplished by a feed wheel 30 having a plurality of pins 31 mounted about its peripheral surface. The feed wheel 30 is mounted on a shaft 32 having also mounted thereon a ratchet 33. The ratchet 33 is advanced by means of a pawl 34 pivotally mounted to an armature 35. A spring 36 connected to the armature 35 and to a suitable portion of the frame of the apparatus normally urges the armature and pawl towards the left and into engagement with the ratchet 33. A magnet 37 is provided for actuating the armature 35 to advance the feed wheel 31 in step by step increments. The circuit for actuating the magnet 37 may be traced from a ground 38, through conductor 39, magnet 37, conductor 40, make-break contact 41, battery 42, conductor 43 and hence to ground 44. The make-break contact 41 is actuated by a cam 46 which is mounted on a shaft 47 of a transmitter distributor. Hence, each time the cam 46 rotates one complete revolution, the contact 41 is closed to energize the relay 37 to advance the feed wheel 31 one increment and hence advance a new series of permutations on the tape 10 to the sensing station 17.

In Fig. 3 there is shown an alternative embodiment of the invention wherein the tape 10 is advanced in step by step increments as disclosed in the embodiment shown in Figs. 1 and 2 over a light transmitting guide rod 51 and then past a semi-circular guide rod 50. A series of photo cells 20 identical with those disclosed in Figs. 1 and 2 is positioned beneath the light transmitting guide rod 51. The tape 10 is advanced past the guide rod 51 wherein its direction of travel is changed by approximately 45° and then over the guide rod 50 wherein the direction of travel of the tape is transferred back to its original direction. Upon the tape passing the guide rod 51 the lids 13 being hinged at a point which passes the sensing station first tend to take the same direction as the tape 10 which changes its course of direction by about 45°. Thus a gap 52 exists between the lids 13 and the tape 10. Light from the lamp 18 is projected through the gap 52 onto the light transmitting guide rod 51 wherein the light is transmitted to actuate the respective photo-electric cells 20 in accordance with the permutations on the tape 10 in the sensing station.

In Fig. 4 there is illustrated a further embodiment of the invention. In this instance the tape 10 is advanced over a light conductor rod 53 to change the direction of advance to effectuate the raising of the lids 13. The tape 10, then passes under a fixed guide rod 54 and the direction of advance again reverts back to the original direction. The light source 18 is positioned in line with the end of rod 53. Light projected from the light source 18 passes longitudinally through the rod 53 and then transversely of the rod at points exposed by the raised lids 13. Light projected through the raised lids 13 is sensed by the photoelectric cells 20 in a manner identical with that explained in regard to the embodiments disclosed in Figs. 1, 2 and 3.

In Fig. 5 there is illustrated still another embodiment of a method and apparatus for sensing the permutations in tape having lidded apertures. The tape 10 is advanced past a fixed guide rod 56 to change the direction of advance of the tape and thence over a second fixed guide rod 55 whereby the direction of feed of the tape reverts back to its original direction. Again as in the embodiment disclosed in Fig. 3 the lids 13 at the sensing station 57 tend to raise away from the tape 10 and in so doing a gap 58 is formed between the lid 13 and the tape 10. Light from the lamp 18 identical with the lamp disclosed in Figs. 1 and 2 is projected through the gap 58, through the aperture 12 and through a series of light conducting rods 59 similar to those disclosed in Figs. 1 and 2 and finally is picked up by the photo cells 20 identical with the cells disclosed in Figs. 1, 2 and 3.

In Fig. 6 there is disclosed a start-stop transmitter distributor of the commutator brush type. The transmitter consists of a plurality of commutator segments 61, which are connected through conductors 62 to the photo-electric cells 20. A solid commutator ring 63 is connected to an outside line 64 which in turn is connected to an outlying receiving station (not shown). A brush 65 connected to the constantly rotating shaft 47 spans the commutator segment 61 and ring 63. The photo cells 20 are connected through conductors 67 to line battery and a stop segment 68 on the transmitter is connected through a conductor 69 to line battery. The transmitter is also provided with a start segment 70.

In operation of the transmitter, the photo-electric cells 20 are energized in accordance with the permutations of the lidded apertures in the sensing station. The lidded apertures being raised permit the transmission of light to energize the respective photo-electric cells whereby the energized photo-electric cells 20 connect line battery to their respective segments 61 of the transmitter. Thus, as the commutator brush 65 rotates, it contacts the segment 70 wherein a no current impulse or start signal is transmitted over the line 64. The brush then sequentially engages the segments 61 and if the photo-electric cells 20 connected to the particular segments are energized, electrical current or marking impulses are transmitted from line battery through the energized photo-electric cell 20, over the respective conductor 62, through a segment 61, through the brush 65, through the commutator ring 63 and hence over line 64 to the outlying receiving station. If a particular photo-electric cell is not energized, the line battery will in effect be disconnected from the segment 61 and a no current or spacing impulse will be transmitted. The brush continues to rotate until it engages the segment 68 whereby a steady current impulse is transmitted over the line 64, to indicate the stop signal for that particular set of character impulses.

Upon completion of the transmission of a signal, the shaft 47 is rotated to move the cam into position to close the contact 42 (Fig. 2) to energize the magnet 37 and hence to advance the feed wheel 30 one increment whereby another series of permutations are brought into the sensing station to initiate another sequence of operations.

It is to be understood that the above described methods and arrangements of apparatus are simply illustrative of the applications of the principles of the invention and that many other modifications may be made without departing from the invention.

What is claimed is:

1. A method of photo-electrically sensing the permutations in tape having lidded apertures therein which comprises advancing the tape through a sensing station, raising the lids on the permutations in the tape without obstructing the apertures formed by the raised lids, projecting light through said raised lidded permutations, and then energizing a photo-electric sensing device with the projected light.

2. The method of sensing the permutations in tape having lidded apertures which comprises feeding the tape in a step-by-step manner through a sensing station, deflecting the tape from the straight line feed whereby the lids in the tape tend to follow the path of the tape as it is deflected to completely expose the aperture beneath the lids, projecting light through the apertures exposed by the deflection of the tape, and then conveying the light to a photo-electric sensing means which is actuated in accordance with the permutations of the raised lidded apertures in the tape.

3. A method for sensing the permutations in tape wherein the permutations are in the form of apertures having hinged covers which comprises advancing the tape in a straight line, changing the direction of the path of movement of the tape to form an angle bend in the tape, projecting light against the tape at the point of the bend, said bending of the tape being sufficient to raise the hinged covers and completely expose the apertures therebeneath as they pass over the bend, and then conveying light passed through the apertures of the raised hinged covers of the tape from the vicinity of the tape to a photo-electric sensing means.

4. In an apparatus for detecting the permutations in apertured tape wherein the apertures are lidded, means for advancing the tape to a sensing station, means for raising the lids on the permutations while the tape is in the sensing station, said raising means providing no obstruction to the passage of light through the apertures formed by the raised lids, means for projecting light through the apertures formed by the raised lids, and means for sensing the light passing through the tape.

5. In an apparatus for sensing the permutations in tape having lidded apertures, means for advancing the tape through a sensing station, a blower for projecting air against the tape as it passes through the sensing station to expose the apertures, a light source positioned in the sensing station for projecting light onto the tape, and photo-electric means positioned on the other side of the tape for sensing the permutations of light passing through the exposed apertures of the tape.

6. In an apparatus for sensing the permutations in tape having lidded apertures, means for advancing the tape through a sensing station, air projection means positioned within the sensing station and below the tape for the purpose of projecting an air stream against the tape, said air stream being sufficiently strong to raise the lids of the permutated apertures, a light positioned above the tape to project light rays down onto the tape, a plurality of light conducting means positioned below the tape and having one end thereof positioned in the vicinity of the air projection means to conduct light therefrom, and a photo-electric sensing means positioned at the other end of the light conducting means for sensing the light.

7. In an apparatus for sensing the permutations in tape having lidded apertures, means for advancing the tape in a straight line to a sensing station, means located within the sensing station for changing the direction of travel of the tape, said means changing the direction of the tape sufficiently to form a gap between the lids and the tape, light means located in the sensing station for projecting light through the gaps, and photo-electric means positioned beneath the tape for sensing a light passing through the gaps formed by the raised lids in the apertured tape.

8. In an apparatus for sensing the permutations in tape having lidded apertures, means for advancing the tape in a straight line to a sensing station, a light transmitting rod positioned within the sensing station for engaging the tape to cause its direction of advance to change whereby the lids on the tape are progressively raised, a light source positioned within the sensing means for illuminating one side of the tape, and photo-electric sensing cells positioned on the other side of the tape for sensing the light transmitted through the apertured permutations of the raised lids in the tape and through the light transmitting rod.

9. In an apparatus for sensing the permutations in tape having lidded apertures, means for advancing the tape through a sensing station whereby direction of the movement of the tape entering and leaving the sensing station remains constant, a first means in the sensing station for engaging the tape to change the direction of movement, a second means also positioned within the sensing station for engaging the tape to change the direction of movement of the tape back to its original direction, said first direction changing means acting to progressively raise the lids of the permutations as the tape advances through the sensing station, a light source positioned on one side of the tape and adjacent to the location of said first direction changing means, a plurality of light conducting rods juxta-positioned on the other side of the tape in the immediate vicinity of the first direction changing means, and a plurality of photo-electric cells positioned at the other ends of the light conducting rods for sensing the light transmitted through the raised lids of the permutated tape.

10. In an apparatus for sensing the permutations in tape having lidded apertures, means for advancing the tape in a straight line to a sensing station, a light conductive rod located within the sensing station for engaging the tape to cause its direction of advance to change whereby the lids on the tape are progressively raised, a light source positioned within the sensing means for projecting light onto the light conductive rod to illuminate one side of the tape, and a series of photo-electric sensing cells positioned opposite to the light conductive rod on the other side of said tape for sensing light projected through the raised lids by the light conducting rod.

11. In an apparatus for energizing a telegraph transmitter, a sensing station for detecting the permutations in tape having lidded apertures, said sensing station including means to advance the tape, means to raise the lids on the tape as it passes through the sensing station without obstructing the apertures exposed by the raised lids, means to project light through the raised lids, photo-electric means for sensing the light projected through the raised lids, and means interconnecting the photo-electric means with the telegraph transmitter to energize the transmitter in accordance with the light passed through the permutations in the tape.

12. In an apparatus for sensing permutations of lidded apertures in an elongated message tape, each of said lidded apertures being arranged in a transverse and longitudinal row, means for advancing the tape in step by step increments to successively present transverse rows of permutated lidded apertures to a sensing station, said sensing station including an air compressing means, a manifold positioned on one side of the tape, means for conducting compressed air from the air compressing means to the manifold, a plurality of nozzles connected to the manifold for projecting and directing compressed air against the tape, each of said nozzles being positioned in alignment with one of the longitudinal rows of permutated lidded apertures, whereby the lids are progressively raised as the tape is moved through the sensing station, means for projecting light through the apertures having raised lids, and means for photo-electrically sensing the light passed through the apertures.

13. In an apparatus for sensing an apertured preform wherein each aperture is provided with a lid, means for projecting light onto the preform, means for applying a force to the tape to raise the lids, said force applying means adapted to not interfere with the passage of light through substantially the complete apertures exposed by the raised lids, and means for sensing the light passed through the apertures having raised lids.

14. In an apparatus for sensing permutations of lidded apertures formed in a message tape, means for advancing the tape through a sensing station, means for projecting light onto the tape, means within the sensing station for subjecting the tape and lids to a pressure differential whereby the lids are raised to expose the apertures without obstructing the passage of light through the exposed apertures, and means for sensing the light passed through the apertures having raised lids.

RANSOM D. SLAYTON.

References Cited in the file of this patent

UNITED STATES PATENTS

| Number | Name | Date |
| --- | --- | --- |
| 2,326,148 | Larson et al. | Aug. 10, 1943 |
| 2,345,289 | Reiber | Mar. 28, 1944 |
| 2,382,251 | Parker et al. | Aug. 14, 1945 |